United States Patent [19]
DeGiglio et al.

[11] Patent Number: 4,999,946
[45] Date of Patent: Mar. 19, 1991

[54] PLANT TRAY WITH LOCKING MECHANISM AND METHOD OF USE

[75] Inventors: Michael DeGiglio, Staten Island; Michael F. Dowgert, New York, both of N.Y.

[73] Assignee: Agro Dynamics, East Brunswick, N.J.

[21] Appl. No.: 405,136

[22] Filed: Sep. 11, 1989

[51] Int. Cl.$^5$ .............................................. A01G 9/10
[52] U.S. Cl. ........................................... 47/73; 47/86; 47/84; 206/423
[58] Field of Search ................. 47/73, 84, 77, 85, 87, 47/86; 206/423

[56] References Cited

U.S. PATENT DOCUMENTS

| 3,606,004 | 9/1971 | Fruehwirth | 47/84 X |
| 3,868,054 | 2/1975 | Congleton | 206/423 X |
| 4,120,301 | 4/1979 | Jones | 47/84 X |

FOREIGN PATENT DOCUMENTS 2202712 8/1972 Fed. Rep. of Germany ...... 206/423

Primary Examiner—David A. Scherbel
Assistant Examiner—Jerrold D. Johnson
Attorney, Agent, or Firm—Curtis, Morris & Safford

[57] ABSTRACT

A plant tray having a locking mechanism which secures the contents of a propagation strip having a plurality cells containing growth medium and plants, and methods of using the same during the transportation or storage. The locking mechanism is an L-shaped moveable device which, when pivoted, easily secures the contents of the cells in place during shipment. The locking mechanism may be readily placed in an open position to facilitate removal of the contents.

5 Claims, 2 Drawing Sheets

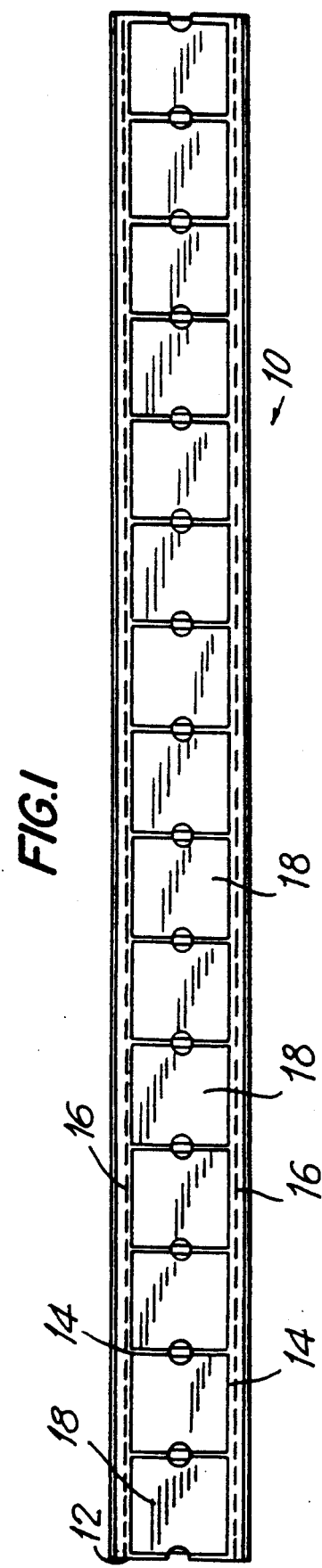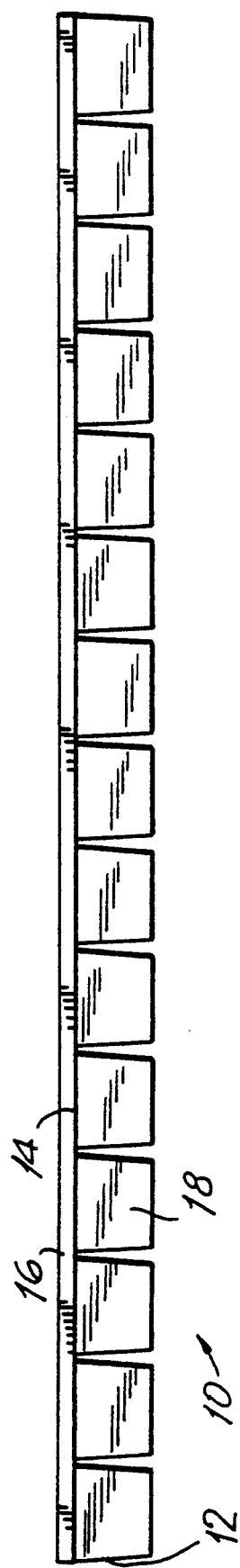

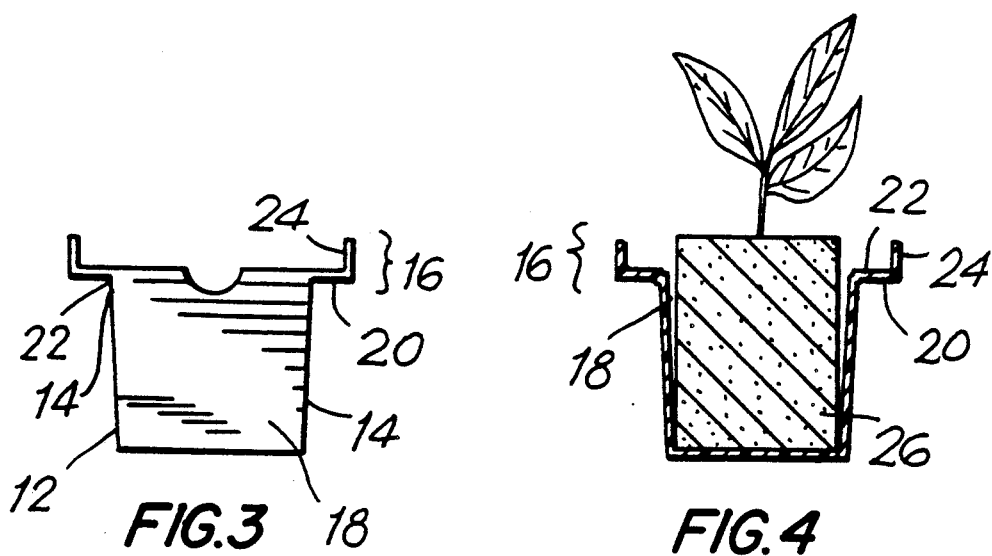
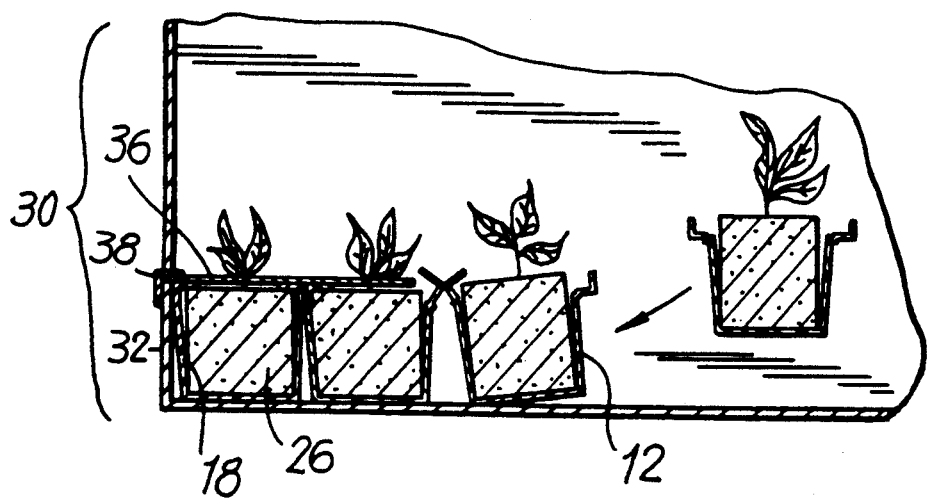
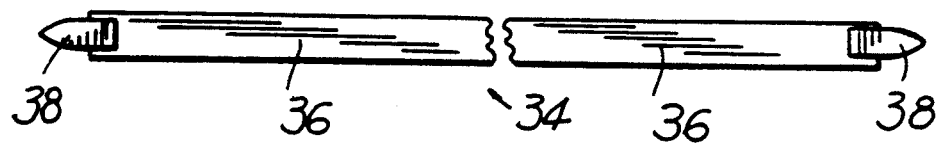

PLANT TRAY WITH LOCKING MECHANISM AND METHOD OF USE

BACKGROUND OF THE INVENTION

1. Field of the Invention

The present invention concerns a plant tray and method of use, and more particularly is directed to a propagation and shipping tray having a locking mechanism which positively locks plants in place during storage and shipment.

Seedling plants are typically grown in propagation strips. These propagation strips may be made of molded plastic and generally provide a succession of pockets or cells to contain the growth medium and the individual plants. In the present invention, two L-shaped plastic devices function as locks. These L-shaped locks are hingeably molded at an attachment point on either side of upper edge of the propagation strip. The L-shaped locks secure the contents of the cells of the propagation strip.

When the propagation strip having the L-shaped lock is inserted into a carton, so that the leading edge of the strip abuts the interior carton wall or another strip of plants already packed, the L-shaped lock on the leading edge pivots upward, forcing one arm of the "L" over the top of the propagation strip, thereby locking the contents of all the cells of that propagation strip in place.

2. Description of the Relevant Art

Containers having a mechanism or apparatus to hold contents, including plants, in place during shipment are generally known.

For example, U.S. Pat. No. 4,742,644 concerns a shipping container for plants having rigid S-shaped members molded to the inside of the container such that two plants are positioned between each pair of the S-shaped members.

U.S. Pat. No. 4,251,951 is directed to a method of cultivating planting and carrying plants which involves transport or carrier frames having vertical Y-shaped members forming rigid, diverging flanges at the upper edge of the vertical member. The plants are slid horizontally, one by one, between the diverging flanges for placement and removal.

U.S. Pat. No. 3,606,004 provides a shipping container for potted plants whereby foldable flaps of a tray secure individual pots of plants inserted into a tray.

U.S. Pat. No. 3,284,949 concerns a plant shipping container having covers for plant trays through which the stem of the plant may protrude.

Other trays for shipping of plants are shown in U.S. Pat. No. 3,788,002, which shows a collapsible insert for a seedling tray and U.S. Pat. No. 3,660,934, which concerns a molded, expandable, breakaway nursery tray.

A shipping container for an individual plant is shown in U.S. Pat. No. 2,649,807, while U.S. Pat. No. 3,992,810 teaches a multi-compartmental container having channels and dividers suitable for shipping seedlings.

U.S. Pat. No. 1,795,672 is directed to an article carrier while U.S. Pat. No. 1,670,498 is directed to a shipping and display carton for incandescent lamps which may serve also as a vending or display rack.

OBJECTS OF THE INVENTION

It is an object of the invention to provide a plant propagation and shipping tray having a locking mechanism, which is easy to manufacture at high production volumes with a minimum of parts and without the need for unduly complex manufacturing machinery.

It is another object of this invention to provide for a plant propagation and shipping tray which has an easily actuated and reliable locking mechanism, that will not permit the contents of the tray to be dislodged or disturbed during shipment.

It is a further object of this invention to permit the packing and locking of strips containing multiple plants, thereby eliminating the undesirable need of known shipping container locking mechanisms which require insertion and securing of each individual unit or plant, on a one-by-one basis.

It is yet another object of this invention to provide a propagation tray in which plants can be cultivated and which additionally, serves as a shipping tray which has a moveable locking mechanism to positively secure the growth medium and cultivated plants during shipment.

It is another object of the invention to provide a method of securely packing and locking strips of multiple plants during shipment, which method further provides a propagation and shipping tray having a moveable locking mechanism which when locked positively secures plants during shipment, and which when unlocked, readily permits removal of the contents.

These and other objects are met by the present invention.

SUMMARY OF THE INVENTION

The present invention is directed, inter alia to a plant shipping tray having a locking mechanism, which can be used for both propagation of seedlings and for secure shipment of said seedlings. The tray provides for a propagation strip having a plurality of pockets or cells adapted for the containing of growth medium and plants. The propagation strip has two parallel edges between which the pockets or cells are arranged in a lengthwise manner.

The tray of the invention provides a locking mechanism which is hingeably molded to each parallel edge of the propagation strip. The locking mechanism comprises two L-shaped plastic devices which are hinged at their attachment points to the propagation tray. The strip may be made of molded plastic which may be crimped at the point of attachment of the lock to facilitate movement of the lock. The L-shaped strips are designed to pivot upward at their points of attachment so that one arm of the "L" overlaps the top of the propagation tray, thereby securing the contents of the cells.

Numerous advantages occur with the practice of the present invention. For example, during shipment or storage, the locking mechanism may be easily and quickly placed in the closed or locked position, thereby positively locking the growth medium and/or seedlings into the cells. Thus, the trays of seedlings can be handled and shipped without undue precaution, since the contents of the cells of the propagation tray are positively locked in place.

However, when the purchaser is ready to remove the seedlings from the propagation tray to repot or to plant them, the locking mechanism may be readily positioned into the open or unlocked position by pushing the L-shaped locks downward on their hinges, thereby releasing the contents of the cells for purposes of removal.

Additionally, the invention provides for automatic locking during the packing process. Placement of the propagation strips having the L-shaped locks into a properly sized carton will permit automatic locking of the mechanism. As the first propagation strip is placed into the carton, the leading edge of the propagation strip having the lock abuts the interior of the carton wall thereby moving the L-shaped lock upward on its hinge, positively locking the cell into place.

As each subsequent propagation strip is placed into the carton, it abuts the previously introduced strip, thereby concurrently securing the second lock on the strip already introduced, and securing the lock on the leading edge of the strip being introduced. Thus, both the packing and the locking of the propagation strips may be accomplished simultaneously in a one-step process.

BRIEF DESCRIPTION OF THE DRAWINGS

In the specification and the accompanying drawings, applicants have shown and described several preferred embodiments of their invention and have suggested various alternatives and modifications thereto, but it is to be understood that these are not intended to be exhaustive and that many changes and modifications can be made within the scope of the invention. The suggestions herein are selected and included for purposes of illustration in order that others skilled in the art will more fully understand the invention and principles thereof and will thus be enabled to modify it and embody it in a variety of forms, each as may be best suited to the conditions of a particular use.

FIG. 1 is a top view of the propagation strip. Broken lines indicate the edge where the L-shaped locks are hingeably attached.

FIG. 2 is a side view of the propagation strip.

FIG. 3 is an end view of a propagation strip showing the lock in the open or unlocked position.

FIG. 4 is a cross-sectional view through a cell of the plant propagation strip showing the lock in the open or unlocked position, and showing the placement of the seedling and growth medium in the cell.

FIG. 5 is a cross-sectional view of the plant propagation strip through the cell. This figure shows placement of the propagation strips into a shipping carton, and shows the lock in the closed or locked position for the packed strips and the locks in the open, unlocked position for the unpacked strips.

This figure also shows placement of a common florist's strap over the locked strips and through the wall of the shipping carton.

FIG. 6 is a top broken-away view of the florist's strap which may be used to further secure the packed strips.

DESCRIPTION OF CERTAIN PREFERRED EMBODIMENT

A better understanding of the preferred embodiment of the subject invention will follow from the subsequent written description considered in conjunction with the appended drawings.

Attention is initially directed to FIG. 1 of the drawings in which is illustrated a preferred embodiment of the invention, generally designated as shipping tray 10, including a propagation strip 12 having two parallel edges or outer walls 14 to which are hingeably attached the L-shaped locks 16. The strip 12 contains a plurality of pockets or cells 18 each cell defined by a base, two outer walls and two interior walls, in which the growth mechanism may be placed and in which seedlings may be cultivated.

FIG. 2 is a side view of the shipping tray 10 showing the propagation strip 12 and the plurality of cells 18. The L-shaped lock 16 is hinged to the upper edge 14 of the propagation strip 12.

As shown more clearly in FIG. 3, the L-shaped lock 16 comprises two portions, one being a lower arm 20 which is hingeably attached to a pivot point 22 located at the upper edge of the outer walls 14 of the propagation strip 12. The second portion of the lock 16 is the upper arm 24. When the lock 16 pivots at pivot point 22, the arm 24 is forced over the top of the propagation strip 12 thereby positively locking the contents of the cell 18, into place.

As shown in FIG. 4, the cell 18 may contain a growth medium 26 and/or a seedling plant 28. During shipment, as depicted in FIG. 5, the various propagation strips 12 are placed into a suitably sized carton 30. The leading edge of the propagation strip 12 initially placed into the carton 30 is pushed against the interior carton wall 32 such that the lock 16 leading edge is pushed up against the interior wall 32 and is forced into a locked position over the contents 26 of the cell 18.

As additional propagation strips are subsequently introduced into the carton, the pressure of the leading edge of the subsequent strip against the previously placed strip will simultaneously lock both the second lock on the previous strip and the lock on the leading edge of the second strip. When all strips are loaded into the carton, all the plants are locked in place.

As also shown in FIG. 5, the strips may then be strapped to the bottom of the carton using a common florists' strap 34. FIG. 6 depicts a top broken-away view of a florist's strap 34. The strap has a main portion 36 which may be made for example of wood lath, and two end tabs 38, which may be made of flexible metal. The metal tabs 38 may be inserted through the carton wall 30 and flexed into a locked position, as shown in FIG. 5, thereby further securing the locked strips of plants. Spaced inserts also may be placed into the packed carton which, when the cover is placed on the carton, serve to further secure the strips in place within the carton.

It will be appreciated that the present invention is not limited to application within the floral or agricultural field but finds ready application in various other situations where secure shipment is desired.

The terms and expressions which have been employed are used as terms and expressions of description and not of limitation, and there is no intention in the use of such terms and expressions of excluding any equivalents of the features shown and described or portions thereof, it being recognized that various modifications are possible within the scope of the invention.

What is claimed is:

1. A plant tray having a locking mechanism, said tray comprising
   a propagation strip comprised of a plurality of cells in a linear arrangement and which said cells have a base and four side walls, two of the walls being interior walls and two of the walls being outer walls each having an upper edge, and wherein the cells are joined at the upper edge of outer walls by
   a continuous L-shaped locking flange, which flange is pivotably molded to the upper edge of the outer cell walls thereby joining all of the cells and wherein the L-shaped locking flange may be pivoted upward and over the cells, thereby providing a locking mechanism.

2. A method of securing a plurality of plants for shipment which comprises placing the plants into the cells of the propagation strip of the plant tray having a locking mechanism as defined in claim 6 and which further comprises locking the L-shaped locking flange.

3. A plant tray having a locking mechanism, said tray comprising a propagation strip comprised of a plurality of cells in a linear arrangement, which said cells are adapted to contain a growth medium and plants, and which cells have a base and four side walls each having an upper edge, two of the walls being interior walls and two of the walls being outer walls, and wherein the cells are joined at the upper edge of the outer walls by a continuous L-shaped locking flange pivotably molded to the upper edge of the outer cell walls thereby joining all of the cells and wherein upward pivoting action of the L-shaped flange moves the flange upward and over the cell thereby locking in place the contents of the propagation strip cells.

4. A plant tray having a locking mechanism, said tray comprising a propagation strip comprised of a plurality cells in a linear arrangement, which said cells have a base and four side walls, two of the walls being interior walls and two of the walls being outer walls each having an upper edge, and wherein the cells are joined at the upper edge of the outer walls by a continuous L-shaped locking flange pivotably molded to the upper edge of the outer cell walls thereby joining all of the cells and wherein the locking flange is pivotably molded so that when the edge of the flange meets resistance, the L-shaped locking flange pivots upwardly into a closed or locked position so that the upper portion of the L-shaped flange is forced over the top of the cell, thereby locking contents of the cell in place.

5. A method for locking contents of the cells of a plant tray in place comprising:
  (a) providing a propagation strip comprised of a plurality of cells in a linear arrangement, which said cells have a base and four side walls and wherein two of the walls are interior walls and two of the walls are parallel outer walls each having an upper edge, and wherein the cells are joined at the upper edge of the two outer side walls by a continuous L-shaped locking flange, which flange is pivotably molded to the upper edge of the outer cell walls thereby joining all of the cells and
  (b) pivoting the L-shaped locking flange upwardly into a closed or locked position, thereby locking the contents of the cells in place.

* * * * *